United States Patent [19]
Miura et al.

[11] Patent Number: 5,880,224
[45] Date of Patent: Mar. 9, 1999

[54] ALIPHATIC POLYESTER CARBONATE AND PROCESS FOR PRODUCING THE ALIPHATIC POLYESTER CARBONATE

[75] Inventors: Mitsuo Miura; Kyohei Takakuwa; Takayasu Fujimori; Maki Ito, all of Ibaraki-ken, Japan

[73] Assignee: Mitsubishi Gas Chemical Company, Inc., Tokyo, Japan

[21] Appl. No.: 901,468

[22] Filed: Jul. 28, 1997

[30] Foreign Application Priority Data

Aug. 5, 1996 [JP] Japan .................................. 8-205995

[51] Int. Cl.$^6$ .................................................. C08G 63/64
[52] U.S. Cl. ........................ 525/439; 528/272; 528/278; 528/279; 528/281; 528/283; 528/296
[58] Field of Search ............................ 525/439; 528/272, 528/278, 279, 281, 283, 296

[56] References Cited

U.S. PATENT DOCUMENTS 4,533,728  8/1985  Waniczek ................................. 528/272
5,654,380  8/1997  Kawai ..................................... 525/439

*Primary Examiner*—Patricia A. Short
*Attorney, Agent, or Firm*—Frishauf, Holtz, Goodman, Langer & Chick, P.C.

[57] ABSTRACT

A process for producing an aliphatic polyester carbonate which comprises reacting (1) an aliphatic dicarboxylic acid compound containing succinic acid as a main component, (2) an aliphatic dihydroxy compound containing 1,4-butanediol as a main component, and (3) (a) a polyhydric alcohol having 3 or more hydroxyl groups in a molecule, (b) a polybasic carboxylic acid compound having 3 or more carboxyl groups in a molecule, or (c) a polybasic carboxylic acid having one or more hydroxyl groups in a molecule to obtain an aliphatic polyester oligomer and reacting the obtained aliphatic polyester oligomer and a carbonate compound, wherein the aliphatic polyester carbonate has a melt tension of 1.5 g or more at 190° C. and at an extrusion rate of 10 mm/minute; a process for producing an aliphatic polyester carbonate which comprises reacting above components (1) and (2) to obtain an aliphatic polyester oligomer and reacting the obtained aliphatic polyester oligomer, above component (3) (a), and a carbonate compound, wherein the aliphatic polyester carbonate has the same properties; and aliphatic polyester carbonates produced by these processes. The aliphatic polyester carbonate is branched and biodegradable, has a high molecular weight, and shows higher melt tension and more excellent molding property in comparison with conventional linear aliphatic polyester carbonates in molding of the polyester carbonate to prepare films, sheets, fibers, and other molded products.

14 Claims, No Drawings

ALIPHATIC POLYESTER CARBONATE AND PROCESS FOR PRODUCING THE ALIPHATIC POLYESTER CARBONATE

FIELD OF THE INVENTION

The present invention relates to an aliphatic polyester carbonate and a process for producing the aliphatic polyester carbonate. More particularly, the present invention relates to an aliphatic polyester carbonate which is branched and biodegradable, has a high molecular weight, and shows higher melt tension and more excellent molding property in comparison with conventional linear aliphatic polyester carbonates in molding of the polyester carbonate to prepare films, sheets, fibers, and other molded products, and a process for producing the aliphatic polyester carbonate.

PRIOR ART OF THE INVENTION

It has heretofore been known that, among polycarbonates, polyester carbonates prepared by using alicyclic compounds or polyester carbonates prepared by using aromatic compounds and aliphatic compounds can be used for molded products because these polyester carbonates generally have a high melting point or a high glass transition temperature. However, these polyester carbonates are not degraded by microorganisms and are not classified as the biodegradable polymer.

Polymers classified as the biodegradable polymer are, for example, aliphatic polyester carbonates prepared by ring-opening polymerization of a cyclic monomer. These aliphatic polyester carbonates contain the unit of a hydroxycarboxylic acid and the unit of an aliphatic carbonate as the constituting units and are used in the medical field because these polyester carbonates have the adaptability to a living body. However, application of these polyester carbonates to molded products is limited because these polyester carbonates are hydrolyzed.

On the other hand, it is known that an aliphatic polyester carbonate can be prepared from an aliphatic dicarboxylic acid, an aliphatic diol, and a diaryl carbonate. However, an aliphatic polyester carbonate containing an aliphatic dicarboxylic acid and an aliphatic diol as the constituting units generally has a low melting point and shows the rubbery property. Although application to an adhesive, a sealing material, a coating material, and a raw material for polymer alloys in combination with other resins has been proposed, this polyester carbonate is mainly used as a raw material of polyurethane in the form of a liquid material of a low molecular weight. Practical application of this polyester carbonate to films and sheets which require a high molecular weight is not found.

The present inventors found that high molecular weight aliphatic polyester carbonates are degraded by microorganisms and can be used for various types of molded products, such as films, sheets, and fibers, as shown in Japanese Patent Application Laid-Open Nos. Heisei 7(1995)-53695, Heisei 7(1995)-53693, and Heisei 8(1996)-27362. However, it was also found by later studies that linear, aliphatic polyester carbonates having no branch occasionally show defective molding in the preparation of films, sheets, blow molded products, and other molded products because of a low melt tension, i.e., low ability to retain a shape in the melted condition, although the above polyester carbonates have excellent molding property and biodegradability. For example, neck-in was found in molding of films and sheets, and draw-down and uneven thickness were found in blow molding. The defective molding can be prevented by optimizing the molding condition to some extent. However, the problem has not been solved essentially because the defective molding is caused by the insufficient melt tension of the resin. Increasing the molecular weight of the resin has been known as the general method for increasing the melt tension. However, this method markedly deteriorates the molding property because of decrease in the melt fluidity. Therefore, development of a polyester carbonate which can keep the melt fluidity and has a high melt tension to prevent the defective molding has been desired.

SUMMARY OF THE INVENTION

Accordingly, the present invention has an object of providing an aliphatic polyester carbonate which is branched and biodegradable, has a high molecular weight, and shows higher melt tension and more excellent molding property in comparison with conventional linear aliphatic polyester carbonates in molding of the polyester carbonate to prepare films, sheets, fibers, and other molded products.

The present inventors studied extensively to increase the melt tension of an aliphatic polyester carbonate which is obtained by melt polycondensation of a diaryl carbonate and an aliphatic polyester oligomer, particularly an aliphatic polyester oligomer which is obtained from an aliphatic dicarboxylic acid containing succinic acid as the main component and an aliphatic dihydroxy compound containing 1,4-butanediol as the main component, and it was found that the above object can be achieved by introducing a branched structure into the chain of the polyester carbonate by using a polyhydric alcohol having 3 or more hydroxyl groups in a molecule, a polybasic carboxylic acid compound having 3 or more carboxyl groups in a molecule, or a polybasic carboxylic acid compound having 1 or more hydroxyl groups in a molecule and adjusting the weight-average molecular weight to 120,000 or more.

Thus, the present invention provides a process for producing an aliphatic polyester carbonate which comprises reacting (1) an aliphatic dicarboxylic acid compound containing succinic acid as a main component, (2) an aliphatic dihydroxy compound containing 1,4-butanediol as a main component, and (3) (a) a polyhydric alcohol having 3 or more hydroxyl groups in a molecule, (b) a polybasic carboxylic acid compound having 3 or more carboxyl groups in a molecule, or (c) a polybasic carboxylic acid having one or more hydroxyl groups in a molecule to obtain an aliphatic polyester oligomer and reacting the obtained aliphatic polyester oligomer and a carbonate compound;

wherein the aliphatic polyester carbonate has a melt tension of 1.5 g or more, preferably 2 g or more, more preferably 4 g or more, at 190° C. and at an extrusion rate of 10 mm/minute and a weight-average molecular weight of 120,000 or more, and an aliphatic polyester carbonate produced by the process.

The present invention also provides a process for producing an aliphatic polyester carbonate which comprises reacting (1) an aliphatic dicarboxylic acid compound containing succinic acid as a main component and (2) an aliphatic dihydroxy compound containing 1,4-butanediol as a main component to obtain an aliphatic polyester oligomer and reacting the obtained aliphatic polyester oligomer, (3) a polyhydric alcohol having 3 or more hydroxyl groups in a molecule, and a carbonate compound, the aliphatic polyester carbonate having a melt tension of 1.5 g or more at 190° C. and at an extrusion rate of 10 mm/minute.

The present invention also provides a polyester carbonate which is produced in accordance with any of the above processes.

DETAILED DESCRIPTION OF THE INVENTION

The process for producing an aliphatic polyester carbonate of the present invention comprises step 1 which comprises reacting (1) an aliphatic dicarboxylic acid compound containing succinic acid as the main component, (2) an aliphatic dihydroxy compound containing 1,4-butanediol as the main component, and (3) (a) a polyhydric alcohol having 3 or more hydroxyl groups in a molecule, (b) a polybasic carboxylic acid compound having 3 or more carboxyl groups in a molecule, or (c) a polybasic carboxylic acid compound having 1 or more hydroxyl group in a molecule in the presence of a transesterification catalyst to obtain an aliphatic polyester oligomer and step 2 which comprises reacting the obtained aliphatic polyester oligomer and a carbonate compound.

The process for producing an aliphatic polyester carbonate of the present invention also comprises step 1' which comprises reacting (1) an aliphatic dicarboxylic acid compound containing succinic acid as the main component and (2) an aliphatic dihydroxy compound containing 1,4-butanediol as the main component in the presence of a transesterification catalyst to obtain an aliphatic polyester oligomer and step 2' which comprises reacting the obtained aliphatic polyester oligomer, (3) a polyhydric alcohol having 3 or more hydroxyl groups in a molecule, and a carbonate compound.

The polyhydric alcohol having 3 or more hydroxyl groups in a molecule, the polybasic carboxylic acid compound having 3 or more carboxyl groups in a molecule, or the polybasic carboxylic acid compound having 1 or more hydroxyl group in a molecule of component (3) is used in an amount of 0.05% by mol to 5% by mol of the amount of the aliphatic dicarboxylic acid compound containing succinic acid as the main component of component (1). When the amount of component (3) is less than 0.05% by mol, the melt tension and the molding property show little improvement. When the amount of component (3) is more than 5% by mol, gelation tends to take place in a short time, and control of the molecular weight is very difficult. More preferably, the polyhydric alcohol, the polybasic carboxylic acid compound, or the polybasic hydroxycarboxylic acid compound of component (3) is used in an amount of 0.1% by mol or more and 3% by mol or less of the aliphatic dicarboxylic acid compound and/or the derivative of component (1) so that an aliphatic polyester carbonate having an excellent melt molding property is provided with stability without possibility of gelation.

In step 1 and step 1', a polyester oligomer having a number-average molecular weight of 500 to 5,000 is produced in the presence of a catalyst at a temperature of 100° to 250° C., preferably 150° to 220° C., while water formed by the reaction and an excess amount of the aliphatic dihydroxy compound are removed. When the molecular weight of the polyester oligomer is higher than the above range, the content of the carbonate bond in the polymer obtained after the last step is markedly low to cause decrease in the biodegradability, and a molecular weight higher than the above range is not preferable. However, because the molecular weight of a polyester can easily be increased by bonding oligomers to each other with the carbonate bond, the polyester oligomer may have a molecular weight higher than the above range when the biodegradability is not required. When the molecular weight of the polyester oligomer is lower than 500, the melting point of the polymer obtained after the last step is decreased, and the polymer cannot be used in practical applications.

The pressure in the reaction is selected so as to achieve the above object. The pressure may be reduced to 300 mm Hg or less to accelerate the reaction.

In the reaction of the aliphatic dicarboxylic acid compound containing succinic acid as the main component and/or the derivative with the aliphatic dihydroxy compound containing 1,4-butanediol as the main component in step 1 or step 1', the aliphatic dihydroxy compound is used in an amount larger than the theoretical amount. Specifically, the aliphatic dihydroxy compound is used in an amount of 1.05 to 2.00 mol per 1 mol of the aliphatic dicarboxylic acid compound. When the amount of the aliphatic dihydroxy compound is larger, the reaction time tends to be longer, and the acid value tends to be smaller. The molecular weight and the acid value of the obtained aliphatic polyester oligomer and the remaining amount of the aliphatic dihydroxy compound can be controlled by suitably adjusting the speed of removal of the unreacted aliphatic dihydroxy compound by distillation and the reaction rate. For achieving a suitable balance between these values, it is practical that a suitable combination of the conditions, such as the initial amounts of components, the catalyst, the temperature, the pressure, and the reaction time, is used, or an inert gas is blown into the reaction system at a suitable flow rate.

For example, when the pressure is decreased rapidly, the reaction time and the residual amount of the aliphatic dihydroxy compound in the oligomer can be decreased, but the amount of the unreacted carboxylic acid is increased, i.e., the acid value is increased. The increase in the acid value is not preferable from the standpoint of decomposition of the carbonate compound by side reactions and coloring.

On the other hand, an increase in the amount of the catalyst increases the reaction rate, but the thermal stability of the polymer obtained after the last stage is inferior. Therefore, the reaction is conducted by adjusting the pressure in three steps and using a small amount of the catalyst. The first step is conducted mainly to remove water formed by the reaction and is conducted under an ordinary pressure. The second step is conducted for completing the condensation reaction with dehydration. In other words, the second step is an aging step to decrease the acid value. Water and a small amount of the aliphatic dihydroxy compound are removed by distillation under a reduced pressure of about 200 to 80 mm Hg. The third step is conducted to achieve a high molecular weight by removing the excess amount of the aliphatic dihydroxy compound by distillation. The pressure is decreased to 2 mm Hg or less in the last stage. The molecular weight, i.e., the hydroxyl value of the terminal hydroxyl group, can be controlled by the amount of the aliphatic dihydroxy compound removed by distillation. The hydroxyl value of the terminal hydroxyl group is preferably in the range of 20 to 200 KOH mg/g.

In step 2, a high molecular weight compound is formed by reacting the polyester oligomer obtained in step 1 and a carbonate compound. In step 2', a high molecular weight compound is formed by reacting the polyester oligomer obtained in step 1', a polyhydric alcohol having 3 or more hydroxyl groups in a molecule, and a carbonate compound. In both step 2 and step 2', phenols and alcohols formed as byproducts in the reaction and some amount of the aliphatic dihydroxy compound or compounds derived from the aliphatic dihydroxy compound are removed at a temperature of 150° to 250° C., preferably 200° to 230° C. Carbonate compound used in the reaction is in an amount by mol in the range of 0.45 to 0.55 times, preferably in the range of 0.47 to 0.51 times, the amount by mol of the terminal hydroxyl group in the polyester oligomer or the total amount by mol of the terminal hydroxyl group in the polyester oligomer and the terminal hydroxyl group in the polyhydric alcohol having 3 or more hydroxyl groups in a molecule. The content of the carbonate bond in the obtained polyester carbonate is in the range of 1.8 to 33% by mol, preferably in the range of 3 to 25% by mol. When the content of the carbonate bond is increased, the melting point is decreased although the biodegradability is increased. Therefore, it is necessary that the content of the carbonate bond be controlled in accordance with the application.

The polyester oligomer used in the process is not limited to a single type. It is also possible that two or more types of polyester oligomers are independently prepared from different materials and mixed together in suitable amounts to produce a block copolymer.

When the temperature of the reaction for producing a high molecular weight product is high, the obtained product is sometimes colored although the polymerization reaction is fast. Therefore, a high temperature exceeding the above range is not preferable. It is preferable that the reaction is conducted while the pressure is slowly decreased in accordance with the necessity, reaching 3 mm Hg or less in the last stage.

The polyester carbonate obtained after step 2 or step 2' contains 1 to 3% by weight of cyclic oligomers. About 300 ppm of phenols and alcohols as a byproduct and less than 20 ppm of unreacted carbonate compound are also contained, occasionally.

When a cyclic oligomer formed from two molecules of 1,4-butanediol and two molecules of succinic acid, among the cyclic oligomers, is contained in an amount more than 0.6% by weight, the cyclic oligomer causes precipitation of white crystals on the surface of a film or a sheet to impair the transparency after the film or the sheet has been stored for about one month. Therefore, it is preferable that a deactivating agent for a catalyst is added to the aliphatic polyester carbonate in the melt condition under a nitrogen atmosphere to deactivate the catalyst, and then the volatile matter is removed under a reduced pressure by using an apparatus having an excellent ability to produce a new surface so that the content of the cyclic oligomers is reduced to 0.6% by weight or less. It is preferable that phenols and alcohols are removed by vaporization together with the cyclic oligomers because phenols and alcohols has the problem of smell during molding.

The deactivating agent for a catalyst is added in an amount by mol in the range of 0.3 to 10 times, preferably 0.5 to 5 times, the amount by mol of the catalyst. As the deactivating agent for a catalyst, a phosphorus compound, such as phosphoric acid, polyphosphoric acid, phosphorous acid, and an ester of these acids, is preferably used. The procedure of removing the cyclic oligomers is preferably conducted at a high temperature under a high vacuum. The temperature is 130° to 300° C., preferably 180° to 280° C., and the pressure is 10 mm Hg or less, preferably 5 mm Hg or less, more preferably 2 mm Hg or less.

Examples of the polyhydric alcohol having 3 or more hydroxyl groups which is used for the polyester carbonate of the present invention include glycerol, trimethylolethane, trimethylolpropane, 1,2,4-butanetriol, pentaerythritol, dipentaerythritol, tripentaerythritol, 3-methylpentane-1,3,5-triol, 1,2,6-hexanetriol, and phloroglucine.

Trimethylolpropane is particularly preferable. It was found that an aliphatic polyester carbonate having a high degree of whiteness can be obtained when trimethylolpropane is used.

Examples of the above polybasic carboxylic acid compound having 3 or more carboxyl groups in a molecule which is used for the aliphatic polyester carbonate of the present invention include trimellitic acid, trimellitic anhydride, pyromellitic acid, pyromellitic anhydride, propanetricarboxylic acid, and trimesic acid.

As the aliphatic dicarboxylic acid compound of component (1), succinic acid, a derivative thereof, or a combination of succinic acid and at least one compound selected from a group consisting of other aliphatic dicarboxylic acid compounds represented by general formula (I) is used:

$$R^1OCO\text{—}R^2\text{—}COOR^3 \qquad (I)$$

wherein $R^2$ represents an alkylene group having 1 to 8 carbon atoms, and $R^1$ and $R^3$ each represent hydrogen atom or an alkyl group having 1 to 3 carbon atoms.

As the aliphatic dihydroxy compound of component (2), 1,4-butanediol or a combination of butanediol and at least one compound selected from a group consisting of other aliphatic dihydroxy compounds represented by general formula (II) is used:

$$HO\text{—}R^4\text{—}OH \qquad (II)$$

wherein $R^4$ represents an alkylene group having 1 to 8 carbon atoms.

Examples of the other aliphatic dicarboxylic acid represented by general formula (I) include oxalic acid, malonic acid, glutaric acid, adipic acid, azelaic acid, diglycolic acid, sebacic acid, dodecandicarboxylic acid, pentadecanedicarboxylic acid, and alkyl esters, phenyl esters, and anhydrides of these acids.

Examples of the other aliphatic dihydroxy compound represented by general formula (II) include ethylene glycol, trimethylene glycol, tetramethylene glycol, pentanediol, hexamethylene glycol, propylene glycol, neopentyl glycol, and octanediol.

In the present invention, when the other aliphatic dicarboxylic acid compound represented by general formula (I) is used in combination with succinic acid, the content of succinic acid is preferably 50% or more from the standpoint of physical properties of the obtained polymer. When the other aliphatic dihydroxy compound represented by general formula (II) is used in combination with 1,4-butanediol, the content of 1,4-butanediol is preferably 50% or more from the standpoint of physical properties of the obtained polymer.

Specific examples of the carbonate compound used in the present invention include diphenyl carbonate, ditolyl carbonate, bis(chlorophenyl) carbonate, m-cresyl carbonate, dinaphthyl carbonate, bis(diphenyl) carbonate, dimethyl carbonate, diethyl carbonate, dibutyl carbonate, ethylene carbonate, diamyl carbonate, and dicyclohexyl carbonate. However, the carbonate compound is not limited to the above compounds described as examples, but carbonate compounds comprising the same type or different types of hydroxy compounds derived from phenols, alcohols, and other hydroxy compounds may also be used.

When a composite system comprising a combination of a zirconium compound or a hafnium compound and one or more compounds selected from a group consisting of compounds of Y, La, Zn, and Sn is used as the catalyst in the present invention, a sufficient reaction rate is obtained by using the catalyst in a total amount smaller than the amount required by using the zirconium compound or the hafnium compound alone as the catalyst.

Particularly when the aliphatic polyester carbonate of the present invention is produced by using the three functional compound, using a catalyst containing a singe type of compound has a problem in that the reaction rate is small in the preparation of a polyester oligomer which is used for preparing the aliphatic polyester carbonate. By using the composite catalyst of the present invention, a desired aliphatic polyester carbonate resin can be obtained with a sufficient reaction rate without causing coloring of the product. The compounds comprised in the catalyst are preferably used in the form of salts of fatty acids, hydroxides, alcoholates, phenolates, or acetylacetonates.

Examples of the zirconium compound and the hafnium compound include zirconium acetylacetonate, acetylacetate zirconyl, zirconium tetraethoxide, zirconium tetraisopropoxide, zirconium tetra-normal-butoxide, zirconium tetra-tertiary-butoxide, zirconyl chloride, zirconium chloride, zirconium sulfate, zirconium oxyacetate, zirconium octanoate, zirconium oxystearate, hafnium acetylacetonate, hafnium tetrabutoxide, and hafnium tetraisopropoxide. Among these compound, zirconium acetylacetonate and hafnium acetylacetonate are preferably used.

Examples of the compounds of Y, La, Zn, and Sn include yttrium acetate, yttrium naphthenate, tris(acetylacetonato) yttrium, lanthanum acetate, zinc acetate, zinc acetylacetonate, zinc benzoate, zinc stearate, zinc oxide, zinc phosphate, tin oxalate, tin acetylacetonate, dibutyltin laurate, dibutyltin oxide, and tin chloride. Among these compounds, zinc acetylacetonate, zinc acetate, and dibutyltin oxide are preferably used.

As the method of addition of the catalyst, the composite catalyst comprising the above components may be used in step 1 or step 1' described above, or alternatively, the zirconium compound or the hafnium compound may be used in step 1 or step 1' and at least one compound selected from a group consisting of the compounds of Y, La, Zn, an Sn may be added in step 2 or step 2'. Any of these methods can be used, and using the composite catalyst comprising the above components in step 1 or step 1' is preferable for decreasing the reaction time of step 1 or step 1'. The catalyst is used in an amount as small as possible. The used amount of the catalyst is generally $5\times10^{-5}$ to 1 part by weight, preferably $1\times10^{-4}$ to $2\times10^{-2}$ parts by weight, per 100 parts by weight of the total of components (1), (2), and (3) as a mixture of raw materials (a reaction mixture).

In accordance with the present invention, an aliphatic polyester carbonate which shows a high melt tension and an excellent molding property and has a weight-average molecular weight of 30,000 or more can be produced. Moreover, the degree of polymerization and the melt tension can be controlled in a wide range. An aliphatic polyester carbonate having a weight-average molecular weight in the range of 30,000 to 400,000 and a melt tension up to about 80 g under the condition of a resin temperature of 190° C. and an extrusion rate of 10 mm/minute can suitably be produced in accordance with the application. When the application and workability in molding are taken into consideration, an aliphatic polyester carbonate having a weight-average molecular weight (Mw) in the range of 120,000 to 320,000 is preferably used.

It is preferable that the polyester carbonate resin has a melt tension of 1.5 g or more, preferably 2 g or more, more preferably 4 g or more, as measured under the condition of a resin temperature of 190° C. and an extrusion rate of 10 mm/minute.

Neck-in during molding of a sheet and draw-down and uneven thickness during blow molding can remarkably be decreased by using the polyester carbonate of the present invention. In accordance with the process of the present invention, coloring of the product is improved, and an aliphatic polyester carbonate resin having good whiteness can be produced.

Auxiliary additives, such as nucleating agents, lubricating agents, stabilizers, antioxidants, and inorganic fillers, can be added when the high purity aliphatic polyester carbonate produced by the process of the present invention is used. The aliphatic polyester carbonate can be molded into various shapes, such as films, sheets, and filaments, in accordance with conventional methods.

The aliphatic polyester carbonate of the present invention has a high melt tension and excellent melt properties in molding and advantageously used for obtaining molded products, such as films, sheets, foamed products, and fibers. The obtained molded products have a high mechanical strength, and the aliphatic polyester carbonate can be used in place of conventional general use resins. The aliphatic polyester carbonate is efficiently degraded in soil or by treatment with activated sludge and can widely be used for packaging materials and molded products which are required to have the biodegradability.

For example, the aliphatic polyester carbonate can be used in the agricultural field as multi-films which cover the surface of soil and keep the temperature, pots and strings for tree planting, and coating materials for fertilizers, in the fishing field as fishing lines and fishing nets, and in the medical field as medical materials and hygienic materials.

The present invention is described in more detail with reference to examples in the following.

In the examples, the molecular weight of a polyester oligomer or a polyester carbonate was measured in chloroform as the solvent using a GPC apparatus (a product of SHOWA DENKO Co., Ltd.; GPC System-11) with reference to Mw (weight-average molecular weight) and Mn (number-average molecular weight) of polystyrene. The hydroxyl value and the acid value were determined in accordance with the method of Japanese Industrial Standard K1557. The content of cyclic oligomers in a polymer was analyzed by reprecipitation of the polymer with methanol from a dichloromethane solution, followed by concentration of the solution left after the reprecipitation and measurement of the concentrated solution by the gas chromatography (using GC14B; a product of SHIMADZU SEISAKUSHO Co., Ltd.). The melt tension was measured by using a capillograph (a product of TOYO SEIKI Co., Ltd.; CAPILLOGRAPH 1B) under the condition of a temperature of 190° C. and an extrusion rate of 10 mm/minute. The melt index was measured by using a melt indexer (a product of TOYO SEIKI Co., Ltd.) under the condition of a temperature of 190° C. and an applied load of 2.16 kg. A T-die film was prepared by using a combination of a single screw extruder, a T-die, and a take-off gear (products of TOYO SEIKI Co., Ltd.) at 200° C. The film was prepared in such a manner that the thickness of the obtained film is about 50 μm. The whiteness was obtained by measuring reflected light from an injection molded plate having a thickness of 1 cm using a color analyzer (a product of TOKYO DENSHOKU Co., Ltd.; TC1800MK2).

Examples and comparative examples for the present invention are shown in the following.

EXAMPLE 1

Into a 50 liter first reactor equipped with a stirrer, a fractional condenser, a thermometer, and a gas inlet, 18.74 kg (158.7 mol) of succinic acid, 21.43 kg (237.8 mol) of 1,4-butanediol, 63.9 g (0.476 mol) of trimethylolpropane, 745 mg of zirconium acetylacetonate, and 1.50 g of zinc acetylacetonate were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 10.40 kg, the reaction was stopped. The total reaction time was 7.0 hours. The obtained oligomer had a number-average molecular weight of 1,800, a hydroxyl value of the terminal hydroxyl group of 106 KOH mg/g, and an acid value of 1.08 KOH mg/g.

Into a 50 liter second reactor equipped with a stirrer, a fractional condenser, a thermometer, and a gas inlet, 24.0 kg of the obtained oligomer was placed, and 4.71 kg of diphenyl carbonate was added to the reactor. The reaction was allowed to proceed in the obtained mixture at a temperature of 210° to 220° C. for 4.5 hours under a pressure which was decreased during the reaction until the pressure reached 1 mm Hg in the last stage of the reaction while phenol was removed by distillation. The pressure was recovered to an atmospheric pressure by introducing nitrogen, and 300 g of a polyester carbonate master batch containing 0.7 g of polyphosphoric acid was added to the reaction mixture. The resultant mixture was stirred to mix the components well, taken out in the form of strands, and formed into pellets.

The obtained high molecular weight product was not colored, had a weight-average molecular weight (Mw) of 181,000 as measured by GPC, contained no gel, and showed a melt tension of 1.8 g and a melt index of 5.4 g/10 minutes. A T-die film could satisfactorily be prepared at 200° C. and a take-off speed of 1.6 m/minute. The neck-in also showed a satisfactory value of 26 mm at a die width of 200 mm. The product had a whiteness of 84 as measured by the color analyzer.

EXAMPLE 2

Into a 50 liter first reactor equipped with a stirrer, a fractional condenser, a thermometer, and a gas inlet, 18.74 kg (158.7 mol) of succinic acid, 21.43 kg (237.8 mol) of 1,4-butanediol, and 745 mg of zirconium acetylacetonate were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 10.40 kg, the reaction was stopped. The total reaction time was 7.5 hours. The obtained oligomer had a number-average molecular weight of 1,800, a hydroxyl value of the terminal hydroxyl group of 109 KOH mg/g, and an acid value of 1.35 KOH mg/g.

Into a 50 liter second reactor equipped with a stirrer, a fractional condenser, a thermometer, and a gas inlet, 24.0 kg of the obtained oligomer was placed, and 49.5 g (0.369 mol) of trimethylolpropane, 5.00 kg of diphenyl carbonate, and 1.16 g of zinc acetylacetonate were added to the reactor. The reaction was allowed to proceed in the obtained mixture at a temperature of 210° to 220° C. for 4.5 hours under a pressure which was decreased during the reaction until the pressure reached 1 mm Hg in the last stage of the reaction while phenol was removed by distillation. The pressure was recovered to an atmospheric pressure by introducing nitrogen, and 300 g of a polyester carbonate master batch containing 0.7 g of polyphosphoric acid was added to the reaction mixture. The resultant mixture was stirred to mix the components well, taken out in the form of strands, and formed into pellets. The obtained high molecular weight product was not colored, had a weight-average molecular weight (Mw) of 184,000 as measured by GPC, contained no gel, and showed a melt tension of 2.0 g and a melt index of 5.0 g. A T-die film could satisfactorily be prepared at 200° C. and a take-off speed of 1.6 m/minute. The neck-in also showed a satisfactory value of 25 mm at a die width of 200 mm. The product had a whiteness of 83 as measured by the color analyzer.

EXAMPLE 3

Into a 50 liter first reactor equipped with a stirrer, a fractional condenser, a thermometer, and a gas inlet, 18.74 kg (158.7 mol) of succinic acid, 21.43 kg (237.8 mol) of 1,4-butanediol, 333.5 g (1.587 mol) of trimesic acid, 745 mg of hafnium acetylacetonate, and 1.50 g of zinc acetylacetonate were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 10.40 kg, the reaction was stopped. The total reaction time was 7.3 hours. The obtained oligomer had a number-average molecular weight of 1,700, a hydroxyl value of the terminal hydroxyl group of 111 KOH mg/g, and an acid value of 1.00 KOH mg/g.

Into a 50 liter second reactor equipped with a stirrer, a fractional condenser, a thermometer, and a gas inlet, 24.0 kg of the obtained oligomer was placed, and 4.82 kg of diphenyl carbonate was added to the reactor. The reaction was allowed to proceed in the obtained mixture at a temperature of 210° to 220° C. for 3 hours under a pressure which was decreased during the reaction until the pressure reached 1 mm Hg in the last stage of the reaction while phenol was removed by distillation. The pressure was recovered to an atmospheric pressure by introducing nitrogen, and 300 g of a polyester carbonate master batch containing 0.7 g of polyphosphoric acid was added to the reaction mixture. The resultant mixture was stirred to mix the components well, taken out in the form of strands, and formed into pellets. The obtained high molecular weight product was not colored, had a weight-average molecular weight (Mw) of 275,000 as measured by GPC, contained no gel, and showed a melt tension of 13 g and a melt index of 2.3 g. A T-die film could satisfactorily be prepared at 200° C. and a take-off speed of 3 m/minute. The neck-in showed a value of 17 mm at a die width of 200 mm. The product had a whiteness of 64 as measured by the color analyzer.

EXAMPLE 4

Into a 50 liter first reactor equipped with a stirrer, a fractional condenser, a thermometer, and a gas inlet, 18.74 kg (158.7 mol) of succinic acid, 21.43 kg (237.8 mol) of 1,4-butanediol, 83.3 g (0.555 mol) of tartaric acid, 745 mg of zirconium acetylacetonate, and 1.50 g of zinc acetate were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 10.40 kg, the reaction was stopped. The total reaction time was 7.0 hours. The obtained oligomer had a number-average molecular weight of 1,700, a hydroxyl value of the terminal hydroxyl group of 114 KOH mg/g, and an acid value of 1.02 KOH mg/g.

Into a 50 liter second reactor equipped with a stirrer, a fractional condenser, a thermometer, and a gas inlet, 24.0 kg of the obtained oligomer was placed, and 4.95 kg of diphenyl carbonate was added to the reactor. The reaction was allowed to proceed in the obtained mixture at a temperature of 210° to 220° C. for 3 hours under a pressure which was decreased during the reaction until the pressure reached 1 mm Hg in the last stage of the reaction while phenol was removed by distillation. The pressure was recovered to an atmospheric pressure by introducing nitrogen, and 300 g of a polyester carbonate master batch containing 0.7 g of polyphosphoric acid was added to the reaction mixture. The resultant mixture was stirred to mix the components well, taken out in the form of strands, and formed into pellets. The obtained high molecular weight product was not colored, had a weight-average molecular weight (Mw) of 280,000 as measured by GPC, contained no gel, and showed a melt tension of 14 g and a melt index of 2.2 g/10 minutes. A T-die film could satisfactorily be prepared at 200° C. and a take-off speed of 3 m/minute. The neck-in showed a value of 18 mm at a die width of 200 mm. The product had a whiteness of 62 as measured by the color analyzer.

EXAMPLE 5

Into a 50 liter first reactor equipped with a stirrer, a fractional condenser, a thermometer, and a gas inlet, 18.74 kg (158.7 mol) of succinic acid, 21.43 kg (237.8 mol) of 1,4-butanediol, 32.83 g (0.08817 mol) of tripentaerythritol, 745 mg of zirconium acetylacetonate, and 1.50 g of zinc acetylacetonate were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 10.40 kg, the reaction was stopped. The total reaction time was 7.0 hours. The obtained oligomer had a number-average molecular weight of 1,800, a hydroxyl value of the terminal hydroxyl group of 108 KOH mg/g, and an acid value of 1.11 KOH mg/g.

Into a 50 liter second reactor equipped with a stirrer, a fractional condenser, a thermometer, and a gas inlet, 24.0 kg of the obtained oligomer was placed, and 4.50 kg of diphenyl carbonate was added to the reactor. The reaction was allowed to proceed in the obtained mixture at a temperature of 210° to 220° C. for 2.5 hours under a pressure which was decreased during the reaction until the pressure reached 1 mm Hg in the last stage of the reaction while phenol was removed by distillation. The pressure was recovered to an atmospheric pressure by introducing nitrogen, and 300 g of a polyester carbonate master batch containing 0.7 g of polyphosphoric acid was added to the reaction mixture. The resultant mixture was stirred to mix the components well, taken out in the form of strands, and formed into pellets.

The obtained high molecular weight product was not colored, had a weight-average molecular weight (Mw) of 273,000 as measured by GPC, contained no gel, and showed a melt tension of 13 g and a melt index of 2.6 g. A T-die film could satisfactorily be prepared at 200° C. and a take-off speed of 3 m/minute. The neck-in showed a value of 15 mm at a die width of 200 mm. The product had a whiteness of 66 as measured by the color analyzer.

COMPARATIVE EXAMPLE 1

Into a 200 ml first reactor equipped with a stirrer, a fractional condenser, a thermometer, and a gas inlet, 74.96 g (0.6348 mol) of succinic acid, 85.72 g (0.9512 mol) of 1,4-butanediol, 5.110 g (0.03809 mol) of trimethylolpropane, 3 mg of zirconium acetylacetonate, and 6 mg of zinc acetylacetonate were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 41.6 g, the reaction was stopped. The total reaction time was 7.0 hours. The obtained oligomer had a number-average molecular weight of 1,700, a hydroxyl value of the terminal hydroxyl group of 104 KOH mg/g, and an acid value of 1.00 KOH mg/g.

Into a 200 ml second reactor equipped with a stirrer, a fractional condenser, a thermometer, and a gas inlet, 96.0 g of the obtained oligomer was placed, and 19.06 g of diphenyl carbonate was added to the reactor. The reaction was allowed to proceed in the obtained mixture at a temperature of 210° to 220° C. for 1 hour under a pressure which was decreased during the reaction until the pressure reached 1 mm Hg in the last stage of the reaction while phenol was removed by distillation. The pressure was recovered to an atmospheric pressure by introducing nitrogen. The content of the reactor was a gel and could not be taken out.

COMPARATIVE EXAMPLE 2

Into a 200 ml first reactor equipped with a stirrer, a fractional condenser, a thermometer, and a gas inlet, 74.96 g (0.6348 mol) of succinic acid, 85.72 g (0.9512 mol) of 1,4-butanediol, 3 mg of zirconium acetylacetonate, and 6 mg of zinc acetate were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 41.6 g, the reaction was stopped. The total reaction time was 7.0 hours. The obtained oligomer had a number-average molecular weight of 1,700, a hydroxyl value of the terminal hydroxyl group of 103 KOH mg/g, and an acid value of 0.90 KOH mg/g.

Into a 200 ml second reactor equipped with a stirrer, a fractional condenser, a thermometer, and a gas inlet, 96.0 g of the obtained oligomer was placed, and 5.110 g (0.03809 mol) of trimethylolpropane and 30.98 g of diphenyl carbonate were added to the reactor. The reaction was allowed to proceed in the obtained mixture at a temperature of 210° to 220° C. for 1 hour under a pressure which was decreased during the reaction until the pressure reached 1 mm Hg in the last stage of the reaction while phenol was removed by distillation. The pressure was recovered to an atmospheric pressure by introducing nitrogen. The content of the reactor was a gel and could not be taken out.

COMPARATIVE EXAMPLE 3

Into a 50 liter first reactor equipped with a stirrer, a fractional condenser, a thermometer, and a gas inlet, 18.74 kg (158.7 mol) of succinic acid, 21.43 kg (237.8 mol) of 1,4-butanediol, 6.388 g (0.04761 mol) of trimethylolpropane, 745 mg of zirconium acetylacetonate, and 1.50 g of zinc acetate were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 10.40 kg, the reaction was stopped. The total reaction time was 7.0 hours. The obtained oligomer had a number-average molecular weight of 1,800, a hydroxyl value of the terminal hydroxyl group of 104 KOH mg/g, and an acid value of 0.87 KOH mg/g.

Into a 50 liter second reactor equipped with a stirrer, a fractional condenser, a thermometer, and a gas inlet, 24.0 kg of the obtained oligomer was placed, and 4.66 kg of diphenyl carbonate was added to the reactor. The reaction was allowed to proceed in the obtained mixture at a temperature of 210° to 220° C. for 6 hours under a pressure which was decreased during the reaction until the pressure reached 1 mm Hg in the last stage of the reaction while phenol was removed by distillation. The pressure was recovered to an atmospheric pressure by introducing nitrogen, and 300 g of a polyester carbonate master batch containing 0.7 g of polyphosphoric acid was added to the reaction mixture. The resultant mixture was stirred to mix the components well, taken out in the form of strands, and formed into pellets.

The obtained high molecular weight product was not colored, had a weight-average molecular weight (Mw) of 186,000 as measured by GPC and contained no gel. The melt tension could not be measured because of drawdown. The melt index was 4.0 g. A T-die film could be prepared at 200° C. and a take-off speed of 1.6 m/minute. The neck-in also showed a value of 35 mm at a die width of 200 mm, which was considerably larger than the values obtained in Examples 1 and 2. The product had a whiteness of 72 as measured by the color analyzer.

COMPARATIVE EXAMPLE 4

Into a 50 liter first reactor equipped with a stirrer, a fractional condenser, a thermometer, and a gas inlet, 18.74 kg (158.7 mol) of succinic acid, 21.43 kg (237.8 mol) of 1,4-butanediol, 745 mg of zirconium acetylacetonate, and 1.50 g of zinc acetylacetonate were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 10.40 kg, the reaction was stopped. The total reaction time was 6.5 hours. The obtained oligomer had a number-average molecular weight of 1,800, a hydroxyl value of the terminal hydroxyl group of 104 KOH mg/g, and an acid value of 0.81 KOH mg/g.

Into a 50 liter second reactor equipped with a stirrer, a fractional condenser, a thermometer, and a gas inlet, 24.0 kg of the obtained oligomer was placed, and 4.90 kg of diphenyl carbonate was added to the reactor. The reaction was allowed to proceed in the obtained mixture at a temperature of 210° to 220° C. for 6 hours under a pressure which was decreased during the reaction until the pressure reached 1 mm Hg in the last stage of the reaction while phenol was removed by distillation. The pressure was recovered to an atmospheric pressure by introducing nitrogen, and 300 g of a polyester carbonate master batch containing 0.7 g of polyphosphoric acid was added to the reaction mixture. The resultant mixture was stirred to mix the components well, taken out in the form of strands, and formed into pellets.

The obtained high molecular weight product was not colored, had a weight-average molecular weight (Mw) of 272,000 as measured by GPC, contained no gel, and showed a melt tension of 5.3 g and a melt index of 0.75 g. A T-die film could be prepared at 200° C. only at a take-off speed as small as 0.7 m/minute at most. The neck-in also showed a value of 37 mm at a die width of 200 mm. Thus, the molding property of the obtained product was markedly inferior to those obtained in Examples 3 to 5. The product had a whiteness of 65 as measured by the color analyzer.

COMPARATIVE EXAMPLE 5

Into a 50 liter first reactor equipped with a stirrer, a fractional condenser, a thermometer, and a gas inlet, 18.74 kg (158.7 mol) of succinic acid, 21.43 kg (237.8 mol) of 1,4-butanediol, 63.9 g (0.476 mol) of trimethylolpropane, and 2.20 g of zirconium acetylacetonate alone in place of a composite catalyst were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 10.40 kg, the reaction was stopped. The reaction took a total time as long as 10.0 hours. The obtained oligomer had a number-average molecular weight of 1,800, a hydroxyl value of the terminal hydroxyl group of 106 KOH mg/g, and an acid value as high as 1.98 KOH mg/g.

Into a 50 liter second reactor equipped with a stirrer, a fractional condenser, a thermometer, and a gas inlet, 24.0 kg of the obtained oligomer was placed, and 4.71 kg of diphenyl carbonate was added to the reactor. The reaction was allowed to proceed in the obtained mixture at a temperature of 210° to 220° C. for 7.5 hours under a pressure which was decreased during the reaction until the pressure reached 1 mm Hg in the last stage of the reaction while phenol was removed by distillation. The pressure was recovered to an atmospheric pressure by introducing nitrogen, and 300 g of a polyester carbonate master batch containing 0.7 g of polyphosphoric acid was added to the reaction mixture. The resultant mixture was stirred to mix the components well, taken out in the form of strands, and formed into pellets.

The obtained high molecular weight product was little colored, contained no gel, and had a weight-average molecular weight (Mw) of 164,000 as measured by GPC although the reaction took a time longer than the time in the reaction using a composite catalyst. The obtained product showed a melt tension of 1.5 g and a melt index of 10.0 g/10 minutes. A T-die film could satisfactorily be prepared at 200° C. and a take-off speed of 1.6 m/minute. The neck-in showed a value of 29 mm at a die width of 200 mm. The product had a whiteness of 78 as measured by the color analyzer.

COMPARATIVE EXAMPLE 6

Into a 50 liter first reactor equipped with a stirrer, a fractional condenser, a thermometer, and a gas inlet, 18.74 kg (158.7 mol) of succinic acid, 21.43 kg (237.8 mol) of 1,4-butanediol, 63.9 g (0.476 mol) of trimethylolpropane, and 2.20 g of zinc acetylacetonate alone in place of the composite catalyst were placed, and the reaction was allowed to proceed at a temperature of 150° to 220° C. for 2 hours under an atmosphere of nitrogen, and water was removed by distillation. Then, the reaction mixture was aged at a pressure of 150 to 80 mm Hg for 3 hours to allow the dehydration reaction to proceed. Subsequently, the pressure was gradually decreased until the pressure reached 2 mm Hg or less in the last stage of the reaction, and water and 1,4-butanediol were removed by distillation. When the total amount of the materials removed by distillation reached 10.40 kg, the reaction was stopped. The reaction took a total time as long as 11.0 hours. The obtained oligomer had a number-average molecular weight of 1,800, a hydroxyl value of the terminal hydroxyl group of 106 KOH mg/g, and an acid value as high as 2.73 KOH mg/g.

Into a 50 liter second reactor equipped with a stirrer, a fractional condenser, a thermometer, and a gas inlet, 24.0 kg of the obtained oligomer was placed, and 4.71 kg of diphenyl carbonate was added to the reactor. The reaction was allowed to proceed in the obtained mixture at a temperature of 210° to 220° C. for 7.5 hours under a pressure which was decreased during the reaction until the pressure reached 1 mm Hg in the last stage of the reaction while phenol was removed by distillation. The molecular weight could not be increased because of the high acid value of the oligomer. The pressure was recovered to an atmospheric pressure by introducing nitrogen, and 300 g of a polyester carbonate master batch containing 0.7 g of polyphosphoric acid was added to the reaction mixture. The resultant mixture was stirred to mix the components well, taken out in the form of strands, and formed into pellets.

The obtained high molecular weight product had a weight-average molecular weight (Mw) of 101,000 as measured by GPC, was not colored, and contained no gel. The melt tension could not be measured. The melt index was 40 g/10 minutes. A T-die film could not be obtained because of the low molecular weight. The product had a whiteness of 79 as measured by the color analyzer.

The results of Examples 1 to 5 and Comparative Examples 1 to 6 are summarized in Table 1.

TABLE 1-1

| | branching agent | | first step | |
|---|---|---|---|---|
| | type | amount[*2] (% by mol) | catalyst | reaction time (h) |
| Example 1 | TMP | 0.30 | composite | 7.0 |
| Example 2 | TMP[*1] | 0.30 | zirconium acetylacetonate | 7.5 |
| Example 3 | trimesic acid | 1.00 | composite | 7.3 |
| Example 4 | tartaric acid | 0.35 | composite | 7.0 |
| Example 5 | TPE | 0.06 | composite | 7.0 |
| Comparative Example 1 | TMP | 6.00 | composite | 7.5 |
| Comparative Example 2 | TMP[*1] | 7.70 | composite | 7.5 |
| Comparative Example 3 | TMP | 0.05 | composite | 6.7 |
| Comparative Example 4 | — | 0 | composite | 6.5 |
| Comparative Example 5 | TMP | 0.30 | zirconium acetylacetonate | 10.0 |
| Comparative Example 6 | TMP | 0.30 | zinc acetylacetonate | 11.0 |

TABLE 1-2

| | physical properties of resin | | | | |
|---|---|---|---|---|---|
| | molecular weight (Mw) | melt index (g/10 min) | melt tension (g) | film neck-in (mm) | whiteness |
| Example 1 | 181,000 | 5.4 | 1.8 | 26 | 84 |
| Example 2 | 184,000 | 5.0 | 2.0 | 25 | 78 |
| Example 3 | 275,000 | 2.3 | 13 | 17 | 64 |
| Example 4 | 280,000 | 2.2 | 14 | 18 | 62 |
| Example 5 | 273,000 | 2.6 | 13 | 15 | 66 |
| Comparative Example 1 | gel | — | — | — | — |
| Comparative Example 2 | gel | — | — | — | — |
| Comparative Example 3 | 186,000 | 4.0 | measurement not possible | 35 | 72 |
| Comparative Example 4 | 272,000 | 0.75 | 5.3 | 37 | 65 |
| Comparative Example 5 | 164,000 | 10.0 | 1.5 | 29 | 78 |
| Comparative Example 6 | 101,000 | 40.0 | measurement not possible | — | 79 |

TMP: Trimethylolpropane
TPE: Tripentaerythritol
composite: A composite catalyst
[*1]Added in the second step
[*2]An amount based on the amount of the aliphatic dicarboxylic acid compound

What is claimed is:

1. A process for producing an aliphatic polyester carbonate which comprises reacting (1) an aliphatic dicarboxylic acid compound containing succinic acid as a main component, (2) an aliphatic dihydroxy compound containing 1,4-butanediol as a main component, and (3) (a) a polyhydric alcohol having 3 or more hydroxyl groups in a molecule, (b) a polybasic carboxylic acid compound having 3 or more carboxyl groups in a molecule, or (c) a polybasic carboxylic acid having one or more hydroxyl groups in a molecule to obtain an aliphatic polyester oligomer and reacting the obtained aliphatic polyester oligomer and a carbonate compound;
    wherein the aliphatic polyester carbonate has a melt tension of 1.5 g or more at 190° C. and at an extrusion rate of 10 mm/minute.

2. A process for producing an aliphatic polyester carbonate which comprises reacting (1) an aliphatic dicarboxylic acid compound containing succinic acid as a main component and (2) an aliphatic dihydroxy compound containing 1,4-butanediol as a main component to obtain an aliphatic polyester oligomer and reacting the obtained aliphatic polyester oligomer, (3) a polyhydric alcohol having 3 or more hydroxyl groups in a molecule, and a carbonate compound, the aliphatic polyester carbonate having a melt tension of 1.5 g or more at 190° C. and at an extrusion rate of 10 mm/minute.

3. A process according to claim 1, wherein (a) the polyhydric alcohol having 3 or more hydroxyl groups in a molecule, (b) the polybasic carboxylic acid compound having 3 or more carboxyl groups in a molecule, or (c) the polybasic carboxylic acid having one or more hydroxyl groups in a molecule of component (3) is used in an amount of 0.05% to 5% by mol of the aliphatic dicarboxylic acid compound of component (1).

4. A process according to claim 2, wherein the polyhydric alcohol having 3 or more hydroxyl groups in a molecule of component (3) is used in an amount of 0.05% by mol to 5% by mol of the aliphatic dicarboxylic acid compound of component (1).

5. A process according to any of claims 1 and 2, wherein the aliphatic polyester oligomer has a number-average molecular weight of 5,000 or less.

6. A process according to any of claims 1 and 2, wherein succinic acid, a derivative thereof, or a combination of succinic acid and at least one compound selected from a group consisting of other aliphatic dicarboxylic acid compounds represented by general formula (I):

$$R^1OCO\text{---}R^2\text{---}COOR^3 \qquad (I)$$

wherein $R^2$ represents an alkylene group having 1 to 8 carbon atoms, and $R^1$ and $R^3$ each represent hydrogen atom or an alkyl group having 1 to 3 carbon atoms, is used as the aliphatic dicarboxylic acid compound of component (1).

7. A process according to any of claims 1 and 2, wherein 1,4-butanediol or a combination of 1,4-butanediol and at least one compound selected from a group consisting of other aliphatic dihydroxy compounds represented by general formula (II):

$$HO\text{---}R^4\text{---}OH \qquad (II)$$

wherein $R^4$ represents an alkylene group having 1 to 8 carbon atoms, is used as the aliphatic dihydroxy compound of component (2).

8. A process according to any of claims 1 and 2, wherein the aliphatic dicarboxylic acid compound of component (1) contains at least 50% by mol of succinic acid, and the aliphatic dihydroxy compound of component (2) contains at least 50% by mol of 1,4-butanediol.

9. An aliphatic polyester carbonate obtained by the process defined in any of claims 1 and 2 which has a molecular weight of 120,000 or more.

10. A process according to any of claims 1 and 2, wherein a phosphorus compound is added to the obtained aliphatic polyester carbonate.

11. A process according to claim 1, wherein a composite system comprising a combination of a zirconium compound or a hafnium compound and one or more compounds selected from a group consisting of compounds of Y, La, Zn, and Sn is used as a transesterification catalyst in an amount of $5\times10^{-5}$ to 1 part by weight per 100 parts by weight of a total amount of components (1), (2), and (3) as a mixture of raw materials.

12. An aliphatic polyester carbonate which is obtained by the process described in claim 11 and has a whiteness of 70 or more as obtained by measurement of reflected light.

13. A process according to any of claims 1 and 2, wherein the polyhydric alcohol having 3 or more hydroxyl groups in a molecule of component (3) is trimethylolpropane.

14. An aliphatic polyester carbonate which is obtained by the process described in claim 13 and has a whiteness of 70 or more as obtained by measurement of reflected light.

* * * * *